United States Patent
Rasmussen et al.

(10) Patent No.: US 9,120,267 B2
(45) Date of Patent: Sep. 1, 2015

(54) METHOD FOR LONGITUDINAL STRETCHING A FILM IN SOLID STATE AND APPARATUS TO CARRY OUT THE METHOD

(76) Inventors: Ole-Bendt Rasmussen, Walchwil (CH); Nikolaj Wettergren Rasmussen, Walchwil (CH)

( * ) Notice: Subject to any disclaimer, the term of this patent is extended or adjusted under 35 U.S.C. 154(b) by 658 days.

(21) Appl. No.: 13/319,134

(22) PCT Filed: May 6, 2010

(86) PCT No.: PCT/EP2010/056220
§ 371 (c)(1),
(2), (4) Date: Feb. 6, 2012

(87) PCT Pub. No.: WO2010/128124
PCT Pub. Date: Nov. 11, 2010

(65) Prior Publication Data
US 2012/0126445 A1    May 24, 2012

(30) Foreign Application Priority Data
May 6, 2009 (GB) .................................. 0907755.3

(51) Int. Cl.
*B29C 49/08* (2006.01)
*B29C 55/18* (2006.01)
*B29C 55/06* (2006.01)

(52) U.S. Cl.
CPC ................. *B29C 55/18* (2013.01); *B29C 55/06* (2013.01); *B29C 55/065* (2013.01)

(58) Field of Classification Search
USPC ........... 264/286, 287, 288.4, 289.3, 291, 292, 264/505, 509, 119, 46.2, 46.3, 172.19, 264/173.1
See application file for complete search history.

(56) References Cited

U.S. PATENT DOCUMENTS 3,812,558 A * 5/1974 Watanabe ........................ 29/6.1
5,028,289 A * 7/1991 Rasmussen ................... 156/229

\* cited by examiner

*Primary Examiner* — Stella Yi
(74) *Attorney, Agent, or Firm* — Robert W Strozier

(57) ABSTRACT

Method and apparatus for longitudinal orientation of thermoplastic film material (20) comprises a width-reduction zone upstream of the longitudinal stretching zone (9, 10), through which the width of the film is gradually reduced so as to allow longitudinal stretching without necking. The width-reduction zone comprises at least two sets of pleating rollers (7, 1) comprising intermeshing grooves or discs for pleating the material. The downstream (1) rollers comprise a mini-roller defined by the following measures a) the pitch of the corrugations, measured from middle of tip to middle of each neighboring tip is 20 mm or less; b) the perimeter from middle of a tip to the middle of each neighboring tip measured along the corrugated roller surface, divided by the said pitch is in the range between 1.10 and 1.80; and c) the diameter of the mini-roller, measured at the tips of the corrugations, is at the highest 4 times the said pitch. Preferably a pair of mini-roller sets is arranged on opposing sides of the film in reciprocating mounts enabling alternate entwining of the film around one then the other mini-roller. The method allows achievement of high tensile strength, yield point, resistance to tear propagation and puncture resistance, especially for polyethylene and polypropylene films.

13 Claims, 4 Drawing Sheets

METHOD FOR LONGITUDINAL STRETCHING A FILM IN SOLID STATE AND APPARATUS TO CARRY OUT THE METHOD

RELATED APPLICATIONS

This application is a 35 U.S.C. §371 national phase filing of PCT Application Serial No. PCT/EP2010/056220 filed 6 May 2010 published as WO2010128124 published 11 Nov. 2010, which claims priority to and benefit of GB 0907755.3 filed 6 May 2009.

BACKGROUND OF THE INVENTION

1. Field of the Invention

The invention concerns method and apparatus for longitudinal orientation of thermoplastic film material, especially with a view to the manufacture of crosslaminates of films which have been uniaxially stretched at a relatively low temperature.

2. Description of the Related Art

It is known that the best all-round strength properties in a crosslaminate are obtained by the followings steps of orientation: first a strong almost uniaxial melt-orientation during the drawdown from the extrusion die, or still better an almost uniaxial orientation while the polymer material is semi-molten, and then further orientation at a rather low temperature. "All-round strength properties" here refers to a combination of tensile strength, yield point, tear propagation resistance and puncture resistance. It is difficult to give a satisfactory explanation why this combination of orientation steps is preferable, but it can briefly be said that when the orientation is carried out in these steps, the molecular chains will exhibit a wide spectrum of different degrees of orientation, and those of relatively low orientation will help the film to re-orient instead of splitting, when it is subjected to tearing or puncturing forces.

However, the stretching at low temperatures causes significant problems, e.g. in films which mainly consists of high density polyethylene (HDPE) or isotactic or syndiotactic polypropylene (PP). One side of this problem is that, when a film is longitudinally stretched, it has a high tendency to contract in the transverse direction, at the same time as its thickness is reduced. This tendency is highest when the temperature is low, e.g. between 10-40° C. which is optimum stretching temperature for HDPE and PP, as far as the achieved properties are concerned. The other side of the problem is that, at these low temperatures the material tends to "neck in", instead of gradually developing the orientation within a reasonably long zone. This means that the stretching must take place between closely spaced stretching rollers or stretching bars, and unless special precautions are taken this will prevent the film from undergoing the needed contraction in the transverse direction.

In U.S. Pat. No. 3,233,029 (Rasmussen), which was published about 40 years ago, a proposal is made for solution of this problem, namely to "anticipate" a substantial part of the transverse contraction to which the film tends, by longitudinal pleating prior to a stretching within one or more short stretching zones, as this is more exactly expressed in the introduction to the present claims. In U.S. Pat. No. 3,233,029, the pleating mechanism described consists of two sets of discs which are mounted spaced apart upon the shafts, one over and one under the film to become pleated, so that discs in one set mesh between the discs in the other set. Thereby the film is forced to form folds or convolutions. It is further disclosed that the film preferably shall pass over a crown-shaped roller adapted to make the stress upon the borders equal to that in the middle of the film. Crown-shaping means that the roller has biggest diameter in its middle, the diameter gradually decreasing towards its ends. Finally it is disclosed that the film preferably is cooled in the stretching zone, which may conveniently be by covering a stretching bar with felt and keeping this felt wet. The water also, by its lubricating action, helps to allow the film the transverse contraction which eliminates the pleats. No pleats remain in the final product.

The inventor managed to make this old invention work with flexibilized HDPE and PP, but only in relatively narrow widths, insufficient for an industrial production e.g. of crosslaminated industrial bags or crosslaminated cover-sheet. When trying to apply the invention to stiffer film, such as film made from plain HDPE or PP, or when trying it on film of greater width, e.g. 1 m wide, the transverse forces applied by the film always caused a transverse stretching of the film in form of thin, longitudinally extending lines. It appears that the principle to apply longitudinal pleating thereby allowing a film transverse contraction during longitudinal stretching, has up to now only been carried out industrially under conditions which also produce transverse stretching and attenuation along narrow longitudinal lines.

GB1,062,936 (Rasmussen) which also was published about 40 years ago, attacks the problems concerning low-temperature stretching of HDPE or isotactic PP film from another angle. This includes subjecting the film to an initial stretching in evenly spaced longitudinal zones by passing the film under tension over a surface corrugated in the direction of movement of the film, the conditions being such that orientation is initiated while the film is passing over the surface in the zones of the film in contact with the raised parts of the corrugations but substantially not in the intervening zones.

It is explained that this produces an orientation in the form or "a substantially regular pattern of shearing lines or microscopic necking-down zones across the whole width of the film", which "facilitate the subsequent stretching procedure for producing a strong orienting".

It is further stated in the general description and in the claims that the corrugated surface either is a grooved bar or a cross-fluted roller. However, the specific description only describes the use of a grooved bar, and the patent does not comprise any indication of the dimensions and practical construction of an applicable grooved roller. In the specific description, the grooved bar is mounted close to the rollers which deliver the film.

The example concerns stretching of a 1 m wide film of HDPE to which was added 10% polyisobutylene. This example was now repeated, using a tubular film extruded with blow-up ratio 1:1, and thereby the claimed advantages of this old invention was reconfirmed. However, using a similar film but extruded in blow-up ratio 1.4:1, the orientation became irregular. When further changing to blown film made from plain HDPE, the process acted damaging to the film. It is noted that blow-up ratio 1:1 is not normally used when extruding film, in part because of the needed size of the extrusion die, and in part because of poorer control of the gauge of the film.

A further draw-back should be mentioned, namely that an immense development of frictional heat takes place when stretching is carried out at industrial velocities over a fixed bar. In WO2009/056601 (Rasmussen et al) which had not been published when the present Application was filed, the first above mentioned invention has been carried further. That improvement is characterized in that the reduction of width takes place gradually within a reduction zone no shorter than half of the original film width, this zone being limited by an upstream roller assembly and a downstream roller or roller assembly installed with varying directions of the axis of rotation, this direction forming an angle of 90° with the machine direction at the middle of the film and gradually changing towards its edges to forward the film in converging manner within the reduction zone. Preferably the width reducing zone is formed between two concentrically arranged "banana" rollers, and preferably there are several pairs of mutually intermeshing grooved banana rollers guiding the film through this zone. All of these grooved banana rollers are concentrical with the banana rollers at the upstream and the downstream end of the width reducing zone.

WO2009/056601 also teaches the feature that the pleating can be carried out in several steps with several sets of grooved rollers, whereby the pitch of the grooves in the sets can be mutually different to develop from a coarser to a finer pleating. Under the conditions that the film surfaces are not too frictional and the film not too thick, the process disclosed in WO2009/056601 will normally be sufficient to achieve a fully satisfactory stretching result, even when plain HDPE or PP film are stretched at about room temperature. However, for lamination purposes the film may have a low melting and consequently rather frictional surface layer. This may resist the elimination of the pleats, which should take place by transverse contraction while the film becomes longitudinally oriented. The stretching occurs mainly while the film is dragged over the roller in the upstream end of the stretching zone, and therefore a high friction between the film and this roller can be harmful. To overcome this problem the pleats must in such cases be as fine as practically possible.

SUMMARY OF THE INVENTION

The present improved process of supplying a thermoplastic polymer film with a longitudinal orientation by stretching in solid state comprises the following known features: at least one stretching operation of the process takes place during advancement of the film in one or more short zones between and/or on two or more stretching rollers, whereby the width measured in a straight line from edge to edge is reduced prior to the stretching in form of a pattern of longitudinally extending pleats.

The formation of pleats is established, at least in part, under use of grooved rollers, i.e. rollers having corrugated surface in a pattern of circular tips and grooves.

The invention is characterized in that in said stretching operation the formation of pleats takes place in at least two steps, the last step carried out by entwining the advancing film under longitudinal tension around a grooved mini roller mounted upstream of and in close proximity to a smooth stretching roller, the mini roller being defined by the following measures
  a) the pitch of the grooving, measured from middle of groove to middle of neighboring groove (or the middle of tip to the middle of neighboring tip) is 20 mm or less,
  b) the perimeter from the middle of a tip to the middle of each neighbor tips measured along the corrugated roller surface, in the embodiment of FIG. 1, (S1+S2+2XS3) divided by the pitch of the grooving is in the range between 1.10 to 1.80,
  c) the diameter of the roller, measured at the tips of the corrugations, is at the highest 4 times the pitch of the grooving.

In this way the pleating can be made finer and/or more even than it hitherto was possible, whereby irregularities in the stretching are overcome.

Apparatus suitable for putting this aspect of the invention into effect is defined for longitudinal orientation of a thermoplastic film (20) comprising, in sequence in the machine direction, I) a width-reducing station comprising pleating rollers comprising intermeshing grooved rollers or intermeshing sets of discs for application of regular longitudinally extending pleats across the width of the film; and ii) a longitudinal stretching station for stretching the film longitudinally in the solid state, comprising at least one smooth stretching roller downstream of the width reducing station, characterized in that the width-reducing station comprises at least two sets of pleating rollers, the downstream set of pleating rollers being mounted in close proximity upstream of the first smooth stretching roller and comprising a grooved mini-roller defined by the following measures a) the pitch of the corrugations, measured from middle of tip to middle of each neighboring tip is 20 mm or less; b) the perimeter from middle of a tip to the middle of each neighboring tip measured along the corrugated roller surface, divided by the said pitch is in the range between 1.10 and 1.80; and c) the diameter of the mini-roller, measured at the tips of the corrugations, is at the highest 4 times the said pitch.

BRIEF DESCRIPTION OF THE DRAWINGS

The inventions shall now be explained in further detail with reference to the Figures.

FIG. 4a shows one outer position and FIG. 4b the other outer position of the reciprocating arrangement.

DETAILED DESCRIPTION OF THE INVENTION

Figure 1:
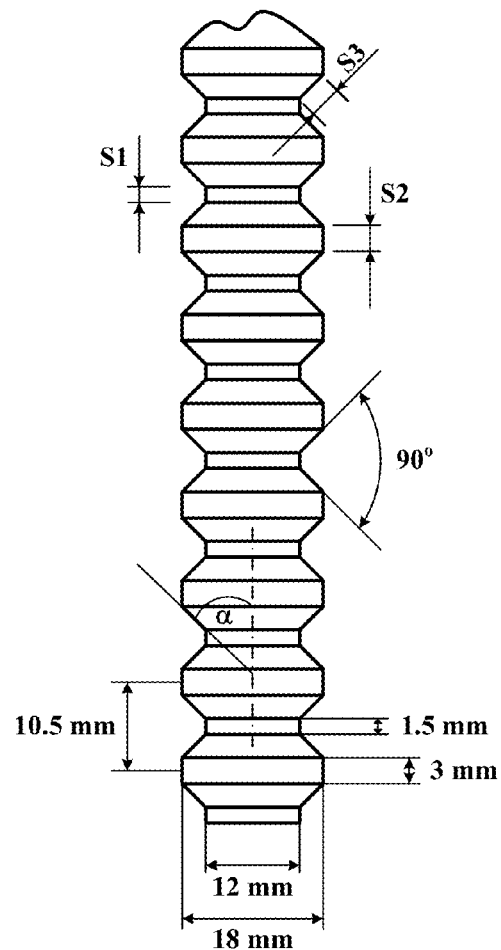
FIG. 1 shows a mini-roller in section through the axis, with dimensions with the ranges which normally are most preferable. The drawing speaks for itself.

The use of a grooved roller with such a deep corrugated profile and such a small diameter, both seen in relation to the pitch of the circular surface corrugation, has a surprising effect. To get an impression of these unusual relations of the dimensions, see FIG. 1. The tensioned film, while being entwined around the mini-roller, will have a high tendency to become dragged towards the bottoms of the grooves, thereby enabling a particular fine and even formation of the pleats. As mentioned a condition is that the film already is pre-pleated when it approaches the mini-roller, but these pleats may be coarser and rather uneven, since the fineness and evenness then become adjusted by the mini-roller. This pre-pleating is preferably carried out by means of one or more pairs of intermeshing grooved rollers, as claimed in the above mentioned U.S. Pat. No. 3,233,029 and WO2009/056601.

The reduction of width, as measured directly from edge to edge taking place by the pre-pleating, should not be substantially lower than the reduction of width (from the width as the film leaves the preceding pleating device) measured when the film leaves the mini-roller, otherwise the mini-roller will cause transverse orientation, normally manifested as "thin lines" which extend longitudinally. The reduction of width taking place by the pre-pleating may be somewhat lower, but it is impossible to state any percentage in this connection, since it depends on several parameters, e.g. the state orientation in the starting film. However, a criteria is that the formation of "thin lines" must be avoided.

As regards the entwining of the film around the mini-roller, this is also a matter which depends on several parameters, but is easy to establish in practice for the given application of the mini-roller. Very generally speaking, the entwinement should not be less than 20° for most applications, preferably no less than 45° and most preferably no less than 60°, measured on the tips. In this specification entwinement means that the film follows a path around a portion of the mini-roller.

The tangent of the corrugation on the surface of the mini-roller should preferably not at any place form an angle steeper than 60° to the axis of the roller. In most cases the majority of the surface should preferably form angles between 30°-50° to the axis within each pitch of the corrugated pattern, (measured between the tangent and the axis, $-\alpha$ in FIG. 1, which is 45°) while the bottoms and especially the tips preferably should be flat or rounded. See in this connection FIG. 1. Preferably at least a part of the surface between tip and groove is frustoconical, that is the axial section has a straight (rectilinear) section. It has been stated above that the perimeter from the middle of a tip to the middle of a neighbor tip, divided by the direct pitch of the grooving is in the range between 1.10 to 1.80. However, normally it is preferable that this ratio is limited to the range 1.20-1.30, (in FIG. 1 it is 1.24).

It has also been stated above that the diameter of the mini-roller, measured at the tips of the corrugations, is at the highest 4 times the pitch of the corrugations. However, preferably it is at the highest 3 times the pitch of the corrugations, and more preferably between 1.5-2.5 times the pitch of the corrugations.

The degree of pleating (i.e. the ratio by which the direct distance from edge to edge is reduced) during each operation in the total stretching process, should normally be adapted such that all pleats have disappeared at the end of the total stretching process. They disappear due to the inherent transverse contraction during longitudinal stretching. Thus, the degree of pleating during the mini-roller stretching operation can be limited such that the pleats disappear during this operation. Alternatively some pleating may be maintained after this operation, but eliminated in a subsequent stretching operation.

Whereas an upper limit of the diameter of the mini-roller has been mentioned in the foregoing, the lower limit is set by the practical limitations. To make it smallest possible, a very important embodiment of the invention is characterized in that the mini-roller is supported by several short support rollers which are assembled along its length, and the axis of which are mutually displaced in manner to nest the mini-roller, which concerns the support of the mini-roller. For a quick understanding of this embodiment reference is made to FIG. 2. There the short idling support rollers, which nest the mini-roller, are mounted in pairs, one support roller on one side and the other support roller on the other side of the mini-roller, and this is the most practical arrangement. However, they can also be mounted individually, the support rollers on one side of the mini-roller being displaced in their axial direction from the support rollers on the other side of the mini-roller. Together they take up the forces which the tentered film exerts on the mini-roller which would tend to make the small diameter mini-roller bow. In order to allot the chosen entwinement of the film around the mini-roller, the diameter of these short support rollers cannot be much greater than the diameter of the mini-roller.

The short support rollers are preferably coated with hard rubber or similar, to avoid abrasion of the mini-roller.

The provision of these support rollers for a narrow roller which acts to stretch the thermoplastic polymer film is believed to be novel and as another aspect of the invention is characterized by the use of two parallel mini-rollers, one on each side of the film, the two rollers reciprocating such that alternately one then the other presses against the film, the roller arrangement upstream and downstream the reciprocating two mini-rollers being such that the film alternately entwines one then the other mini-roller, and the two mini-rollers being arranged relative to one another such that the tips on one mini-roller are aligned with the bottoms of the grooves on the other mini-roller.

When thermoplastic film material is longitudinally stretched, it can in many cases be advantageous to use rollers having as small a diameter as practically possible, since the roller then gets the best grip in the film. Therefore, a method of supplying a thermoplastic polymer film with a longitudinal orientation by stretching in solid state under use of stretching rollers of which at least one stretching roller has a diameter which is 40 mm or less, characterized in that such stretching roller is supported by several short support rollers, which are assembled along its length, and the axis of which are mutually displaced so as to nest the said stretching roller, this support system in connection with the stretching rollers, can find wider uses, including the support of smooth stretching rollers of a relatively small diameter, and is considered an invention in itself. The mini-roller will in practice be manufactured from many short segments. Each of these segments may be fixed to a common shaft, which rotates with bearings mounted at its ends. This assemblage is normally preferable, but alternatively the shaft may be fixed and each of the segments rotating on it. Normally there is no need to supply the mini-roller with drive, but in case there is, the segments must of course be fixed to the shaft.

Another embodiment of the invention is characterized in that the tension of the film, while passing over the mini-roller is adjusted to such a level that orienting of the film starts on the mini-roller. This is particularly useful as a first step of stretching the film subsequent to the haul-off from the extrusion die, or in other words as a "prestretching" process. It is further explained in connection with FIG. 3.

Still another embodiment is characterized by the use of two parallel mini-rollers, one on each side of the film, the two rollers reciprocating such that alternately one then the other presses against the film, the roller arrangement upstream and downstream the reciprocating two mini-rollers being such that the film alternately entwines one then the other mini-roller, and the two mini-rollers being arranged relative to one another such that the tips on one mini-roller are aligned with the bottoms of the grooves on the other mini-roller. This embodiment is in particular useful at the latest step of pleating before the final stretching takes place. This film then meets the set up of mini-rollers in a relatively deeply pleated form, in which the pleats may be relatively coarse and/or uneven.

The arrangement of the two mini-rollers in their axial direction so that the grooves of one roller are offset relative to the grooves of the other roller means that the middle of the tips on one roller are aligned with the middle of the grooves on the other roller. This offsetting in combination with the reciprocation transformed the ingoing coarse and/or uneven pleats to finer and/or more even pleats. The effect is further explained in connection with FIG. 4.

The general idea behind this embodiment of the invention has a wider scope, since it is preferable but not necessary that the reciprocating grooved rollers are mini-rollers, i.e. it is preferable but not necessary that their dimensions are within the limits a) the pitch of the corrugations, measured from middle of tip to middle of each neighboring tip is 20 mm or less; b) the perimeter from middle of a tip to the middle of each neighboring tip measured along the corrugated roller surface, divided by the pitch is in the range between 1.10 and 1.80; and c) the diameter of the mini-roller, measured at the tips of the corrugations, is at the highest 4 times the pitch. The wider scope appears as a process for supplying a thermoplastic polymer film with a longitudinal orientation by stretching in solid state, the stretching taking place during advancement of the film in one or more short zones between and/or on two or more stretching rollers, in which process the width measured in a straight line from edge to edge is reduced prior to the stretching, this reduction being in form of a regular pattern of longitudinally extending pleats, whereby the reduction of width and length of the stretching zone or zones are adapted to allow the film a fully straightening out of the pleats by the inherent tendency in the polymer material to contract transversely while being stretched longitudinally and whereby the formation of pleats is established, at least in part, under use of grooved rollers, i.e. rollers having corrugated surface in a pattern of circular tips and grooved characterized in that the film supplied with pleats is subjected to a process comprising the use of two parallel grooved rollers, one on each side of the film, the two reciprocating such that alternately one then the other presses against the film, the roller arrangement upstream and downstream the reciprocating two grooved rollers being such that the film alternately entwines one then the other grooved roller, and the two grooved rollers are offset from arranged relative to one another, such that the tips on one grooved roller are aligned with the bottoms of the grooves on the other grooved roller. This process defines an invention independent of as set forth, but closely related to the latter, which is a process of supplying a thermoplastic polymer film with a longitudinal orientation by stretching in solid state in one or more stretching operations, the stretching in at least one such operation taking place during advancement of the film in one or more short zones between or on two or more stretching rollers or partly on and partly between such rollers, in which process the width measured in a straight line from edge to edge is reduced prior to the stretching, this reduction being in form of a pattern of longitudinally extending pleats, and whereby the formation of pleats is established, at least in part, under use of grooved rollers, which have a corrugated surface in a pattern of circular tips and grooves, characterized in that in said stretching operation the formation of pleats takes place in at least two steps, the last step carried out by entwining the advancing film under longitudinal tension around a grooved mini-roller mounted upstream of and in close proximity to a smooth stretching roller, the mini-roller being defined by the following measures a) the pitch of the corrugations, measured from middle of tip to middle of each neighboring tip is 20 mm or less;
 b) the perimeter from middle of a tip to the middle of each neighboring tip measured along the corrugated roller surface, divided by the said pitch is in the range between 1.10 and 1.80; and
 c) the diameter of the mini-roller, measured at the tips of the corrugations, is at the highest 4 times the said pitch.

Apparatus suitable for putting this aspect of the invention into effect is an apparatus for longitudinal orientation of a thermoplastic film (20) comprising, in sequence in the machine direction, I) a width-reducing station comprising pleating rollers comprising intermeshing grooved rollers or intermeshing sets of discs for application of regular longitudinally extending pleats across the width of the film; and ii) a longitudinal stretching station for stretching the film longitudinally in the solid state, comprising at least one smooth stretching roller downstream of the width reducing station, characterized in that the width-reducing station comprises at least two sets of pleating rollers, the downstream set of pleating rollers being mounted in close proximity upstream of the first smooth stretching roller characterized in that that downstream set of pleating rollers comprise two parallel grooved rollers, one on each side of the film, the parallel rollers each being mounted on reciprocating mounts, so that alternately one then the other presses against the film, whereby the film alternately entwines one then the other pleating roller and the two rollers being arranged relative to one another such that the tips on one mini-roller are aligned with the bottoms of the grooves on the other mini-roller.

Figure 2:
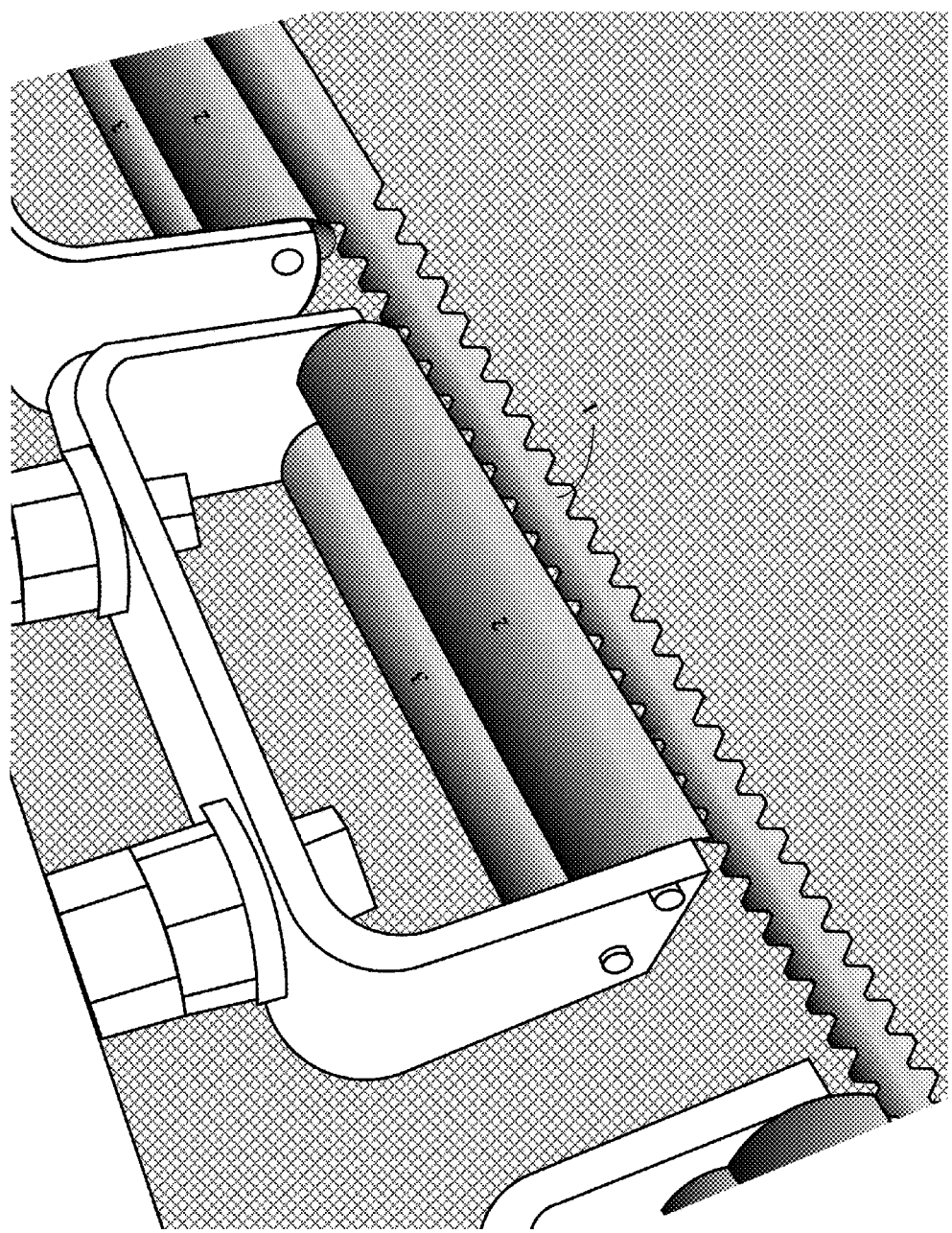
FIG. 2 is a figure showing the mini-roller nested on several short support.

The inventions shall now be explained in further detail with reference to the Figures. FIG. 1 shows a mini-roller in section through the axis, with dimensions with the ranges which normally are most preferable. The drawing speaks for itself. FIG. 2 is a figure showing the mini-roller nested on several short support rollers.

Figure 3:
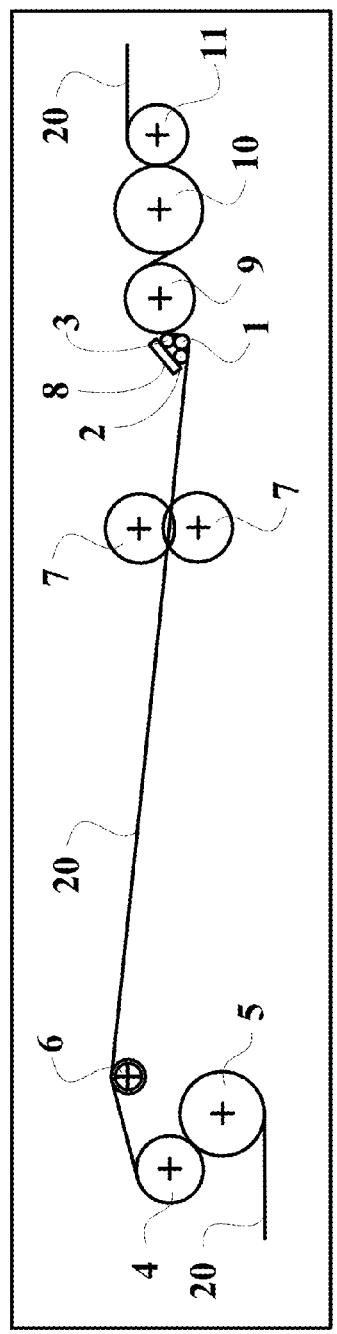
FIG. 3 is a sketch showing the mini-roller set up in a line for prestretching.
Figure 4A:
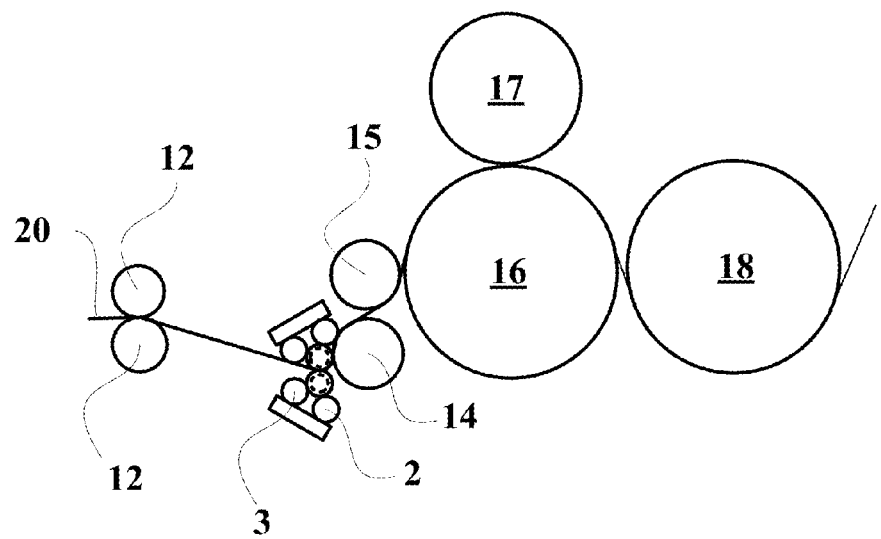
FIGS. 4a and 4b are sketches which illustrate the process in which a pair of grooved rollers reciprocate together in a direction transverse to the film to make ingoing pleats finer or more even.
Figure 4B:
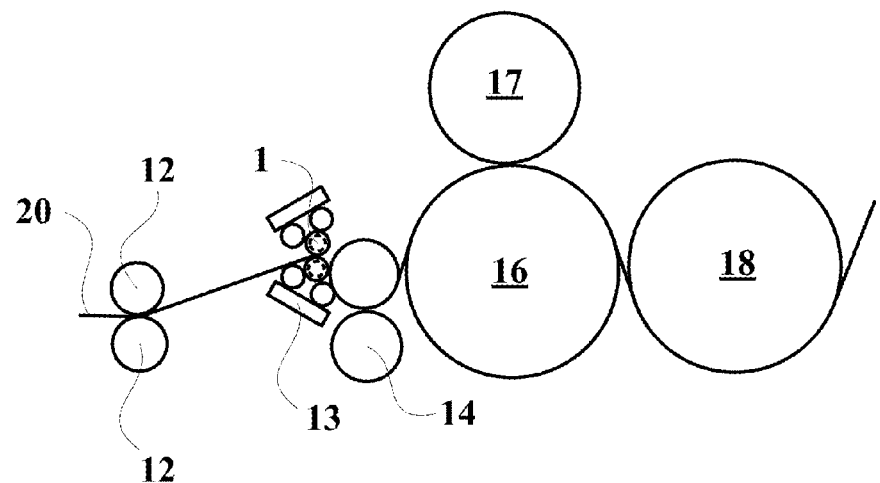

FIG. 3 is a sketch showing the mini-roller set up in a line for prestretching. FIGS. 4a and 4b are sketches which illustrate the process in which a pair of grooved rollers reciprocate together in a direction transverse to the film to make ingoing pleats finer or more even. FIG. 4a shows one outer position and FIG. 4b the other outer position of the reciprocating arrangement.

In FIG. 2 the mini-roller (1) is nested on support roller pairs (2) and (3). Only one pair is shown in full, but the mini-roller may be several meters long to stretch very wide film, and then a great multitude of short support rollers is needed. These support rollers are held by small frames and have small bearings at their ends. The latter may be inside the support roller or inside the small frame. The surface of each support roller is coated with hard rubber. The support rollers are mounted in such a manner that they take up the force which the tensioned film exerts on the mini-roller (see FIGS. 3 and 4).

In FIG. 3 the film (2) which e.g. may mainly consist of HDPE or PP and which may be a lay-flat tube has no orientation other than the melt orientation produced in connection with the extrusion and the haul off from the extrusion die. It goes through a pre-orientation procedure, e.g. in a stretch ratio between 1.5:1 and 2.0:1, starting in the nip between the driven hold-back roller (4) and its rubber-coated counter-roller (5). The tension in the film is established by the driven roller (9). The film passes over a crown-shaped idle roller (6), and after a path which is no less than the width of the film it enters the intermeshing two grooved idle rollers (7), whose grooves have a relatively large pitch, e.g. about 10 times the pitch of the grooves of following mini-roller (1). The intermeshing is set to give the film an even coarse pleating corresponding to about 15% reduction of its width, measured from edge to edge. Without the crown-shaped roller (6) the reduction of width would have the effect that the edges of the film would follow a path from roller (4) to mini-roller (1), which would be longer than the path at the middle of the film, and this difference would be harmful, but the crown-shaping of roller (6) compensates for the difference. The position (6) is variable to make its effect adjustable. Alternatively, this pleating maybe carried out as described in WO2009/056601.

During the passage from the coarse grooved rollers (7) to the mini-roller (1), the coarse pleating gradually turns into a fine pleating with a pitch equally to the pitch of the mini-roller (1), which is idling. This roller is supported by and nested on the many short rollers described in connection with FIG. 2. Reference (8) symbolizes the holding part for these rollers. It is preferably installed in adjustable manner.

By adjustment of the velocity of the driven roller (9) relative to the driven roller (4), these is set up a tension in the film, which causes orientation as the latter passes over the mini-roller (1) and as it passes the short space between (1) and (9), while practically no orientation takes place upstream of the mini-roller (1).

Roller (10), which is positioned close to roller (9), is also driven, while roller (11) is a rubber-coated nip roller. Roller (10) may rotate at the same circumferential velocity as roller (9), by which practically all orientation takes place on the mini-roller (1) and in the space between mini-roller (1) and roller (9), or roller (10) may move faster, e.g. up to about 10% faster than roller (9). In that case further stretching takes place on roller (9) and between rollers (9) and (10). In FIGS. 4a and 4b, mini-rollers are used to make relatively coarse and uneven pleats finer and more even, so as to facilitate and improve a subsequent longitudinal stretching. The film exists from the grooved rollers (12) with a relatively deep pleating corresponding to a reduction of width by a factor of about 1.5:1, but it is considered that the pleats somewhere may lay in a dense distribution and somewhere in a less dense distribution. The two mini-rollers (1) and their support reciprocate up and down, FIG. 4a showing the upper turn position and FIG. 4b the lower turn positions; the other rollers do not reciprocate. The two mini-rollers (1) are mutually displaced in their axial direction, such that the middle of the tips on one corresponds with the middle of the grooves on the other, but preferably they should not intermesh with each other.

In the position shown in FIG. 4a the film is delivered by the upper mini-roller to an idling guide roller (14), from that to another idling guide roller (15), and further to the driven hold-back stretching roller (16). Roller (17) is a rubber-coated nip-roller pressed against (16), and (18) is the first driven, pulling stretching roller. One or more further pulling stretching rollers follow, but are not shown.

All along the route from the mini-roller to the stretching roller (16), the spacing between adjacent rollers are minimized. Furthermore the diameters of rollers (14), (15), (16) and (18) are as small as it is possible without causing problems due to bending of the rollers.

In FIG. 4b the film will be delivered from the lower mini-roller directly to roller (16). The equalizing effect of this reciprocating system can briefly be explained as follows:

Consider that a certain narrow part of the film width has a dense distribution of pleats when it meets a tip on the mini-roller in the position shown in FIG. 4a. The densely pleated film will then tend to be dragged towards the bottoms of the two grooves adjacent to this tip. Thereby this pleating becomes less dense.

Consider on the other hand that a narrow part of the film width has a dense distribution of pleats when it meets a groove on the mini-roller shown in FIG. 4a. Then the distribution will remain dense until the reciprocation has approached the FIG. 4b situation. In that situation the pleating becomes less dense.

The reciprocation in an experimentally determined rhythm, relative to the velocity of the film, the irregularities of the pleating can be minimized, while the pattern of pleating becomes finer than the pitch of each of the two mini-rollers.

We claim:

1. A process of supplying a thermoplastic polymer film having longitudinally extending pleats comprising:
    stretching the advancing film in the solid state in one or more short zones between or on two or more stretching rollers or partly on and partly between such rollers, and
    entwining the advancing film in the solid state under longitudinal tension around a grooved mini-roller having corrugations and stretching on a smooth stretching roller, where the mini-roller is mounted upstream of and in close proximity to the smooth stretching roller, where the mini-roller is characterized by having:
    a) a pitch of the corrugations of 20 mm or less; as measured from a middle of a tip to a middle of each neighboring tip;
    b) a ratio of a perimeter to the pitch ranging between 1.10 and 1.80, where the perimeter is measured from a middle of a tip to a middle of each neighboring tip along the corrugated roller surface; and
    c) a diameter of less than or equal to 4 times the pitch, where a width of the film as measured in a straight line from edge to edge is reduced after the stretching and entwining to form a film having a pattern of longitudinally extending pleats.

2. The process according to claim 1, wherein the entwining takes place around no less than 20° of mini-roller surface, measured on the tips of the roller.

3. The process according to claim 1, wherein a tangent of the corrugations of the surface of the mini-roller at no place forms an angle steeper than 60° to an axis of the roller over a majority of a length of each pitch.

4. The process according to claim 1, wherein the tips are flat or rounded.

5. The process according to claim 1, wherein the ratio ranges between 1.20 and 1.30.

6. The process according to claim 1, wherein the diameter is less than or equal to 3 times the pitch.

7. The process according to claim 1, wherein the mini-roller is supported by several short support rollers which are assembled along its length, and where axes of the support rollers are mutually displaced in manner to nest the mini-roller.

8. The process according to claim 1, wherein the tension of the film while passing over the mini-roller is adjusted to such a level that orienting of the film starts on the mini-roller.

9. The process according to claim 1, wherein the entwining occurs under longitudinal tension around two parallel mini-rollers, one on each side of the film, the two rollers reciprocating such that alternately one then the other presses against the film, the roller arrangement upstream and downstream the reciprocating two mini-rollers being such that the film alternately entwines one then the other mini- roller, and the two mini-rollers being arranged relative to one another such that the tips on one mini-roller are aligned with the bottoms of the grooves on the other mini-roller.

10. A process for supplying a thermoplastic polymer film having longitudinally extending pleats comprising:
    stretching the advancing film in the solid state in one or more short zones between or on two or more stretching rollers or partly on and partly between such rollers, and
    entwining the advancing film in the solid state under longitudinal tension around two parallel grooved rollers, one on each side of the film, the two reciprocating such that alternately one then the other presses against the film, the roller arrangement upstream and downstream the reciprocating two grooved rollers being such that the film alternately entwines one then the other grooved roller, and the two grooved rollers are offset from arranged relative to one another, such that the tips on one grooved roller are aligned with the bottoms of the grooves on the other grooved roller,
    where a width of the film as measured in a straight line from edge to edge is reduced after the stretching and entwining and stretching to form a film having a pattern of longitudinally extending pleats.

11. The process according to claim 1, wherein the thermoplastic polymer is 50% or more of HDPE or crystalline PP or combinations of the two.

12. The process according to claim 1, wherein a degree of pleating during the stretching and entwining is limited such that the pleats disappear.

13. The process according to claim 1, wherein a degree of pleating during the stretching and entwining is such that some pleating is maintained, this pleating may be eliminated by a subsequent stretching operation.

* * * * *